(12) United States Patent
Gao et al.

(10) Patent No.: US 10,808,518 B2
(45) Date of Patent: Oct. 20, 2020

(54) CEMENTING INDICATION SYSTEM

(71) Applicant: Halliburton Energy Services, Inc., Houston, TX (US)

(72) Inventors: Bo Gao, Spring, TX (US); Yuzhu Hu, Spring, TX (US); John P. Singh, Kingwood, TX (US); Walmy Cuello Jimenez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 292 days.

(21) Appl. No.: 15/767,435

(22) PCT Filed: Nov. 11, 2015

(86) PCT No.: PCT/US2015/060190
§ 371 (c)(1),
(2) Date: Apr. 11, 2018

(87) PCT Pub. No.: WO2017/082898
PCT Pub. Date: May 18, 2017

(65) Prior Publication Data
US 2018/0283165 A1    Oct. 4, 2018

(51) Int. Cl.
*E21B 47/005*  (2012.01)
*G01V 3/18*  (2006.01)
*G01V 8/12*  (2006.01)

(52) U.S. Cl.
CPC .............. *E21B 47/005* (2020.05); *G01V 3/18* (2013.01); *G01V 8/12* (2013.01)

(58) Field of Classification Search
CPC .......... E21B 47/0005; G01V 8/12; G01V 3/18
See application file for complete search history.

(56) References Cited

U.S. PATENT DOCUMENTS

| | | | |
|---|---|---|---|
| 5,729,013 A | 3/1998 | Bergren, III | |
| 7,066,256 B2* | 6/2006 | Dillenbeck | E21B 33/05 166/177.4 |
| 2003/0029611 A1 | 2/2003 | Owens | |
| 2012/0205103 A1 | 8/2012 | Ravi et al. | |
| 2014/0076551 A1* | 3/2014 | Pelletier | E21B 47/01 166/253.1 |
| 2014/0239164 A1 | 8/2014 | Rothrock et al. | |

OTHER PUBLICATIONS

International Search Report and Written Opinion of PCT Application No. PCT/US2015/060190 dated Aug. 9, 2016: pp. 1-17.
(Continued)

*Primary Examiner* — David P Porta
*Assistant Examiner* — Meenakshi S Sahu
(74) *Attorney, Agent, or Firm* — Chamberlain Hrdlicka

(57) ABSTRACT

Various embodiments include methods and systems structured to provide an indication of the status of a cementing operation in a wellbore. Electromagnetic radiation from a source can be directed to a fluid region in or around a casing in a wellbore, where an electromagnetic response can be detected from interaction of the electromagnetic radiation in the fluid region. Presence or absence of cement in the fluid region can be determined based the electromagnetic response. Additional apparatus, systems, and methods can be implemented in a variety of applications.

14 Claims, 7 Drawing Sheets

(56) References Cited

OTHER PUBLICATIONS

Gadeken et al., "Tracerscan—A Spectroscopy Technique for Determining the Distribution of Multiple Radioactive Tracers in Downhole Operations," SPWLA Twenty-Seventh Annual Logging Symposium, Jun. 1986: pp. 1-15.
Gore et al., SPE 654-G: "Radioactive Tracer Techniques," Journal of Petroleum Technology, Sep. 1956: pp. 12-17.

* cited by examiner

CEMENTING INDICATION SYSTEM

TECHNICAL FIELD

The present invention relates generally to systems and methods related to oil and gas exploration.

BACKGROUND

In drilling wells for oil and gas exploration, the environment in which the drilling tools operate is at significant distances below the surface. Due to harsh environments and depths in which drilling in formations is conducted, enhanced efficiencies to drilling operations and post drilling operations are desirable.

In oil and gas exploration, cementing operations are conducted to stabilize a casing in a wellbore. Cement is placed in the annulus between the casing and a wall of the wellbore. Determining if a cementing job has been successfully carried out can provide useful information to aid in efficient management of a wellbore. Further, the usefulness of such information may be related to the accuracy or quality of the information derived from measurements that determine the status of the cementing operation.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In general, holding a casing in a position can be accomplished using cement. Cement can also be used as a prevention mechanism with respect to migration of fluid between subsurface formations. In addition to conducting cementing operations in establishing placement of the casing or preventing migration of fluid as a primary task, cementing operations can be conducted to perform remedial cementing to correct problems related to the primary cementing. Cementing typically involves mixing a slurry of cement, cement additives, and water. The cement mixture is pumped down to critical points in the annulus around the casing or in the open hole below the casing string. The hardened cement mixture provides restriction to fluid movement between formations and bonding and support to the casing.

In most conventional cementing operations, the cement mixture is pumped down through the casing and into the annulus around the casing. Alternatively, the cement mixture can be pumped down through the annulus to the critical points in the annulus. Reverse cementing is an operation in which cementing fluids are placed down through the annulus and into the shoe at the bottom of the casing. Reverse cementing has many merits, but due to the lack of tools that accurately determine if a cementing job has been successfully carried out, this operation is not widely used in oil and gas industry. Conventional cementing operations can be considered to be non-reverse cementing operations.

Figure 1:
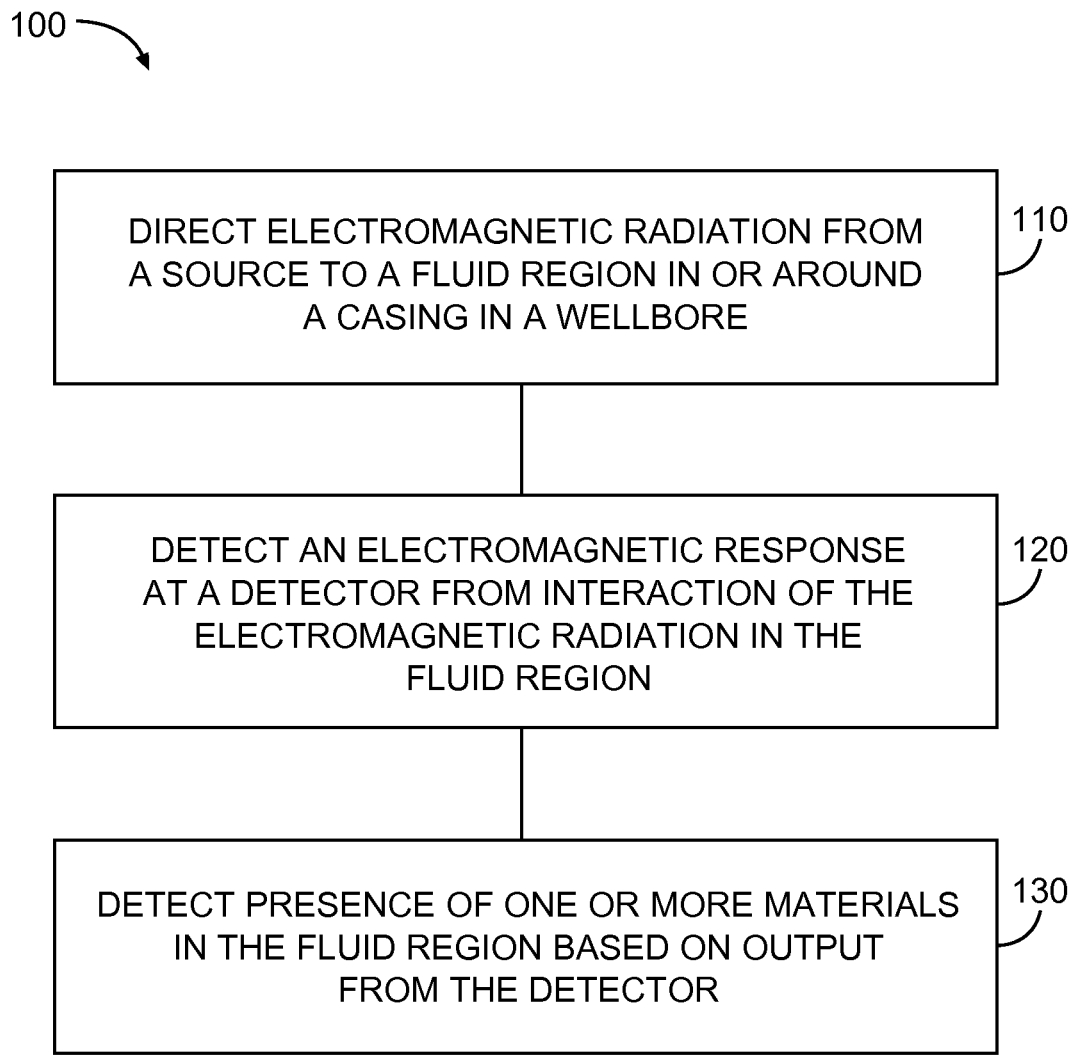
FIG. 1 is a flow diagram of features of an example method conducted in a cementing operation in a wellbore, in accordance with various embodiments.

FIG. 1 is a flow diagram of features of an embodiment of an example method 100 conducted in a cementing operation in a wellbore. At 110, electromagnetic radiation from a source is directed to a fluid region in or around a casing in a wellbore. The fluid region can correspond to the annulus between the casing and a wall of the wellbore. In some cases, the fluid monitored may be in the casing. At 120, an electromagnetic response is detected at a detector from interaction of the electromagnetic radiation in the fluid region. Detecting presence of the one or more materials in the fluid region can include detecting color variation of fluid in the fluid region.

At 130, presence of one or more materials in the fluid region is detected based on output from the detector. The one or more materials being detected can be selected from a group including cement, mud, and spacer, associated with a cementing operation. Mud refers to drilling fluid. Mud may include suspended solids, emulsified water, oil, or other materials associated with drilling. A spacer is a fluid provided to separate the cement slurry and the drilling fluid in a cementing operation. The spacer can be constructed depending on its application, for example, in an operation with as water-based drilling fluid or in an operation with an oil-based drilling fluid. Insoluble-solid weighting agents can be used to densify a spacer. Since cement, mud, and spacer are different materials, they have different properties, which can include different colors of the material. In addition, they can have different properties with respect to reflection and absorption of electromagnetic radiation. Further, one or more dyes can be added to various ones of the cement, mud, and spacer to provide material for the interaction with the electromagnetic radiation.

Detecting presence of the one or more materials in the fluid region can include comparing the output of the detector with a response from a database. Detecting presence of the one or more materials in the fluid region can include comparing one or more wavelengths detected by the detector with a known wavelength selected from a group consisting of wavelengths of one or more cement compositions, one or more mud compositions, one or more spacer compositions, and combinations thereof.

Methods similar to or identical to method 100 can include generating a cement indicator indicating completion of the cementing operation based on detection of the presence of the one or more materials. Methods similar to or identical to method 100 can include a number of procedures. Such methods can include stopping circulation of cement in response to generating the cement indicator. Stopping circulation of cement can include shutting down one or more valves such that relatively high back pressure downhole from a surface is returned back to the surface. Stopping circulation of cement can include shutting down one or more valves using a switch actuated by a signal correlated to the cement indicator. Shutting down the one or more valves can include using two check valves.

Methods similar to or identical to method 100 can include detecting the electromagnetic response at the detector from interaction of the electromagnetic radiation in the fluid region by detecting an electromagnetic response at a detector from interaction of the electromagnetic radiation with a dye in cement or a dye in one or more other fluids in the fluid region. Detecting presence of the one or more materials in the fluid region can include the absence of detection of interaction of the electromagnetic radiation with dye in the one or more other fluids in the fluid region. Methods similar to or identical to method 100 can include detecting the electromagnetic response at the detector from interaction of the electromagnetic radiation in the fluid region by detecting an electromagnetic response at a detector from interaction of the electromagnetic radiation with a tracer in cement or a tracer in one or more other fluids in the fluid region. The one or more fluids may include mud or spacers.

Methods similar to or identical to method 100 can be implemented in a cementing operation that includes reverse cementing. Alternatively, methods similar to or identical to method 100 can be implemented in a conventional cementing operation.

Currently, there are not many openly available procedures related to reverse cementing indicator system. The few which are known involve use of sensors/particles/electronics to activate tools, where these sensors/particles/electronics are generally placed in the lead of cement. When the lead of cement reaches the bottom of the casing, tools installed at the bottom of the casing are activated by sensors. However, in such methods having a large amount of sensors in cement impairs the cement seal, while a small amount of sensors may not activate the tool. When lost circulation occurs, which is a common problem in oil fields, some sensors will either flow into geological formations with cement or be smeared on the wall of the well. Lost circulation is the loss of cement slurry to the formation such that the cement slurry is not circulated back to the surface. Considering these possible events, it is hard to determine how many sensors to be used in one job. In addition, this method is usually expensive.

In various embodiments, a cement indicator can be implemented downhole in a well. Cement indicator systems can be arranged in various formats. A cement indicator system can be structured as cementing indicator system in a conventional cementing operation. A cement indicator system can be structured as a reverse cementing indicator system. Based on sensed conditions, operation of a cementing indicator system can result in the shutting down valves to stop circulation and return high back pressure to the surface, after determining a cementing job has been successfully carried out. The sensed condition can be realized by detecting variations of electromagnetic radiation from fluid around the bottom of the casing. For example, variations in the color of fluid around the bottom of the casing can be detected. No sensors in cements being formed in the annulus are needed to implement cement indicator systems as taught herein.

Figure 2:
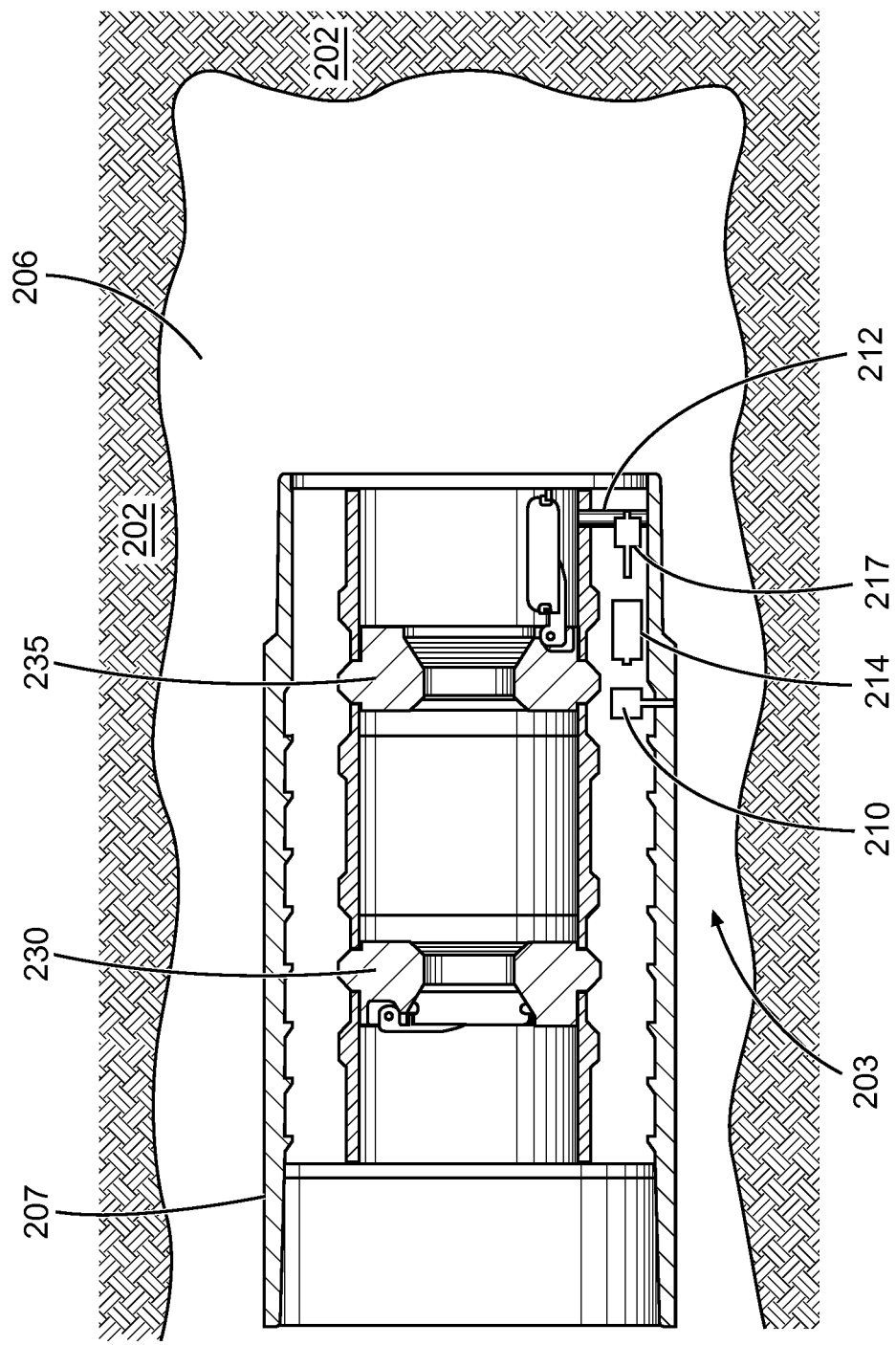
FIG. 2 is a schematic representation of an example of a cement indicator system, in accordance with various embodiments.

FIG. 2 is a schematic representation of an embodiment of an example of a cement indicator system 203. The cement indicator system 203 can be disposed with respect to a casing 207 in a wellbore 206 and include an electromagnetic source coupled with a photodetector 210. The coupled electromagnetic source and photodetector 210 may be powered by a battery 214. The coupled electromagnetic source and photodetector 210 and the battery 214 may be cemented in place with the coupled electromagnetic source and photodetector 210 having an opening in the casing 207, providing a view of field to monitor fluid flow. Alternatively, the coupled electromagnetic source and photodetector 210 and the battery 214 may be positioned using a resin and/or plastic instead of cement.

Two flapper valves 230, 235 can be used as check valves and installed at the bottom of the casing 207. The top valve 230 can allow fluid flow from bottom to top and the bottom valve 235 can prevent fluid flowing from bottom to top in a reverse cementing operation. The bottom valve 235 can be pulled open by a wire 212 when running the casing 207 in the wellbore 206 surround by formation 202. The other end of the wire 212 can be hooked on a linear motor 217, which can act as a switch.

In various embodiments, two check valves can be implemented with the photodetector coupled with an electromagnetic source 210 along with the battery 214 and the switch 217 as part of a cementing detection system that can function as a downhole end of job indicator. The electromagnetic source can be implemented by a light emitting diode (LED). A neutral dye can be used where detection of different electromagnetic properties allows for identification of the presence of the dye, cement, spacer, or drilling mud. The neutral dye can be a composition that will not affect the performance of cement, spacer, or drilling mud and has different electromagnetic properties than cement, spacer, or drilling mud. Such dyes can include, but are not limited to, iron based dyes, copper based dyes, and manganese based dyes. The photodetector can be, but is not limited to a color detector. During operation using a color detector, either cement, spacer, or drilling mud can be mixed with the dye. Having the option to mix with cement, spacer, or drilling mud makes the use of a dye flexible. As a result, the cement, spacer, and mud should have different colors. The cement indicator system can determine when the cementing job is done by detecting the color of fluid around the bottom of the casing.

Figure 3:
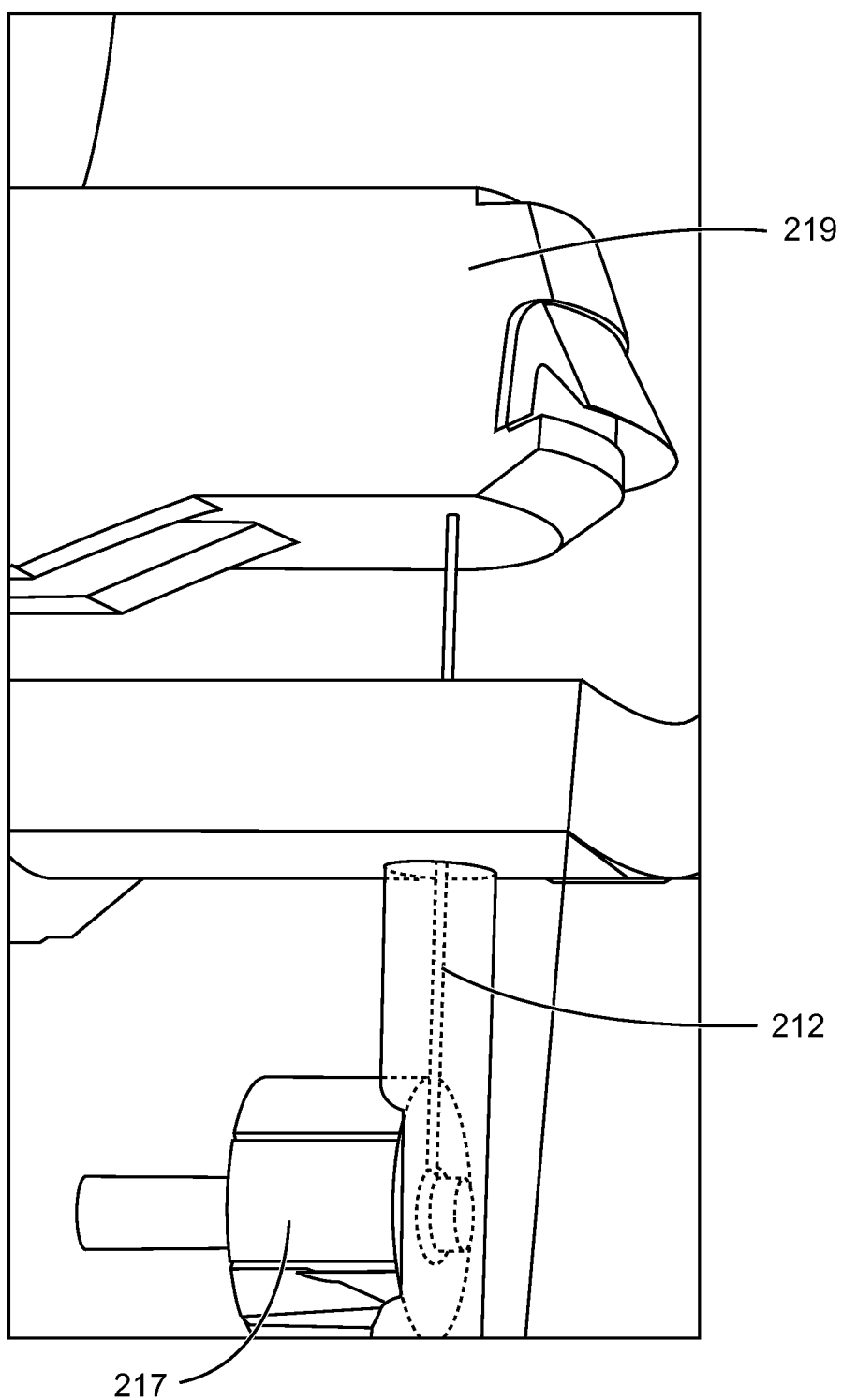
FIG. 3 is a schematic representation of the linear motor of FIG. 2 controlling a flapper valve closure, in accordance with various embodiments.

FIG. 3 is a schematic representation of the linear motor 217 of FIG. 2 controlling a flapper valve closure 219. The linear motor 217 can be controlled by signal coming from the photodetector of the electromagnetic source—photodetector arrangement 210 shown in FIG. 2. In addition to providing energy to the electromagnetic source—photodetector arrangement 210, the battery 217 of FIG. 2 can provide energy for the linear motor 217. The photodetector can monitor electromagnetic radiation from the fluid around the bottom of the casing. For example, electromagnetic radiation reflected back from irradiating the fluid can be monitored to determine the color of the fluid. With respect to the arrangement shown in FIGS. 2 and 3, before cementing in a reverse cementing operation, mud flows into the casing 207 from the bottom. The top valve 230 is opened by the hydraulic force and mud flows through the bottom valve 235 and the top valve 230. Using color monitoring, the cement has different color than the mud. So once the color detector detects the variation of the color of fluid, the color detector of the electromagnetic source—photodetector arrangement 210 can send a signal to the linear motor 217. After receiving the signal, the linear motor 217 can release the wire 212. Then, the lower flapper valve 235 closes by spring and hydraulic force to finish the cementing job.

Indication of the status of the cementing can be provided by comparing the signal received in the photodetector of the coupled electromagnetic source and photodetector 210 to data from experiments performed in a laboratory or in a simulation. The data from the experiments can be stored in a database. The comparison can be viewed as a comparison of the production signals with ideal signals from the lab or simulation. The threshold for the signal processed from the photodetector to provide an indication that the cementing has completed can be an adjustable threshold, or an adjustable delta of a difference between the production signal and the ideal signal. Such a threshold may vary depending on the application from production field to production field.

In addition, a data acquisition and processing chip can be integrated with the valve 235 of FIG. 2, which may be referred to as a "smart valve system." The chip can be programmable to provide control of the valve 235. For example, the programmable chip can delay the closure of the valve to provide shoe track of contamination in the casing 207. Such a programmable chip can control partial closure of the valve 235 to generate high back pressure to notify the surface that the cementing job has been successfully carried out. Further, such a programmable chip can control the valve 235 to close slowly and reduce the high back pressure. A programmable chip can also be implemented with valve 230 of FIG. 2.

Figure 4:
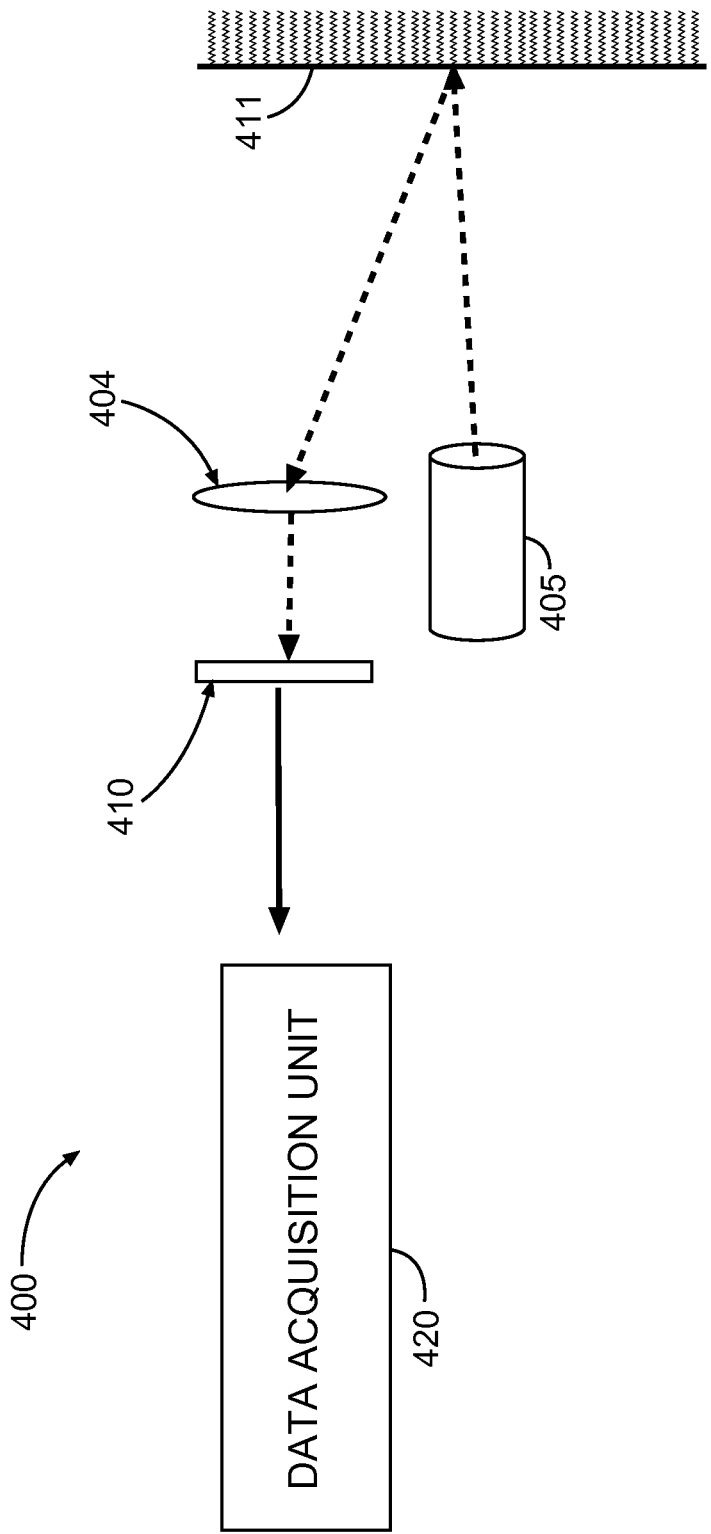
FIG. 4 is a schematic representation of an example implementation of a detector system downhole to determine status of a cementing operation, in accordance with various embodiments.

FIG. 4 is a schematic representation of an embodiment of an example implementation of a detector system 400 downhole to determine status of a cementing operation. The detector system 400 can include an electromagnetic source 405, a band-pass filter 404, a photodetector 410, and a data acquisition unit 420. The electromagnetic source 405 can be an LED arranged to direct the light towards fluid 411 downhole. The fluid can include cement, spacer, or mud, and optionally one or dyes in one or more of the cement, spacer, or mud. The light is not limited to the visible region of the electromagnetic spectrum. Alternatively, the electromagnetic source 405 may be realized by a set of lasers. The lasers of the set can be selected by implementing lasers whose operating wavelengths match with the cement, spacer, mud, or dye to enhance the light provided to the photodetector 410 from interaction with the cement, spacer, mud, and/or dye. Other sources can be used in conjunction with optical elements to direct the light to the fluid 411 with the appropriate range of frequencies. The light may be directed through an opening in a casing or a window structure casing.

The back scattered light can pass through the band-pass filter 404 to the photodetector 410. The photodetector 410 can be implemented using one or more charge-coupled device (CCD) chips. CCD chips are a common type of photodetector. The band-pass filter 404 can be tuned so that it only allows electromagnetic radiation having a narrow range of frequencies to pass through it. These frequencies can be selected to correspond to the color of a dye being used in the cementing operation. Alternatively, the frequencies can be selected to correspond to cement, mud, or spacers being used in the cementing operation. The CCD chip or chips used can detect the intensity of the light being collected. If the mud includes the dye while cement does not, the CCD chip or chips will detect higher intensity when the mud is being circulated. Once cement completely displaces the mud in the annulus, the intensity of the electromagnetic radiation being detected should drop. This real time intensity profile can be sent directly to the data acquisition unit 420. The data acquisition unit 420 can be realized by a chip set that includes one or more integrated circuit chips. The data acquisition unit 420 can be implemented as one more application-specific integrated circuit (ASICs). The data acquisition unit 420 can be implemented as a data acquisition chip arranged to receive a digital signal from the photodetector 410. The data acquisition unit 420 can be disposed as part of a smart valve system. Once the change in intensity is detected by the data acquisition unit 420, the data acquisition unit 420 can signal a valve, such as valve 235 of FIG. 2, to flip the switch, which either completely or partially results in an increase in the operating pressure.

Other designs can be implemented. For example, the switch can be replaced by a system including a set of springs. Energy, which can be stored first in the tool by the set of springs, can be released when needed. This design allows a longer battery life.

Unlike most cementing indicator systems, systems and methods as taught herein do not need any sensors or particles placed in cement, which reduces the potential risks that sensors are lost and the tool cannot be activated. Such systems and methods may eliminate the need of any telemetry system based on electromagnetics, acoustics, and/or fiber optics for communication with the surface, which may save operational time and cost.

Figure 5:
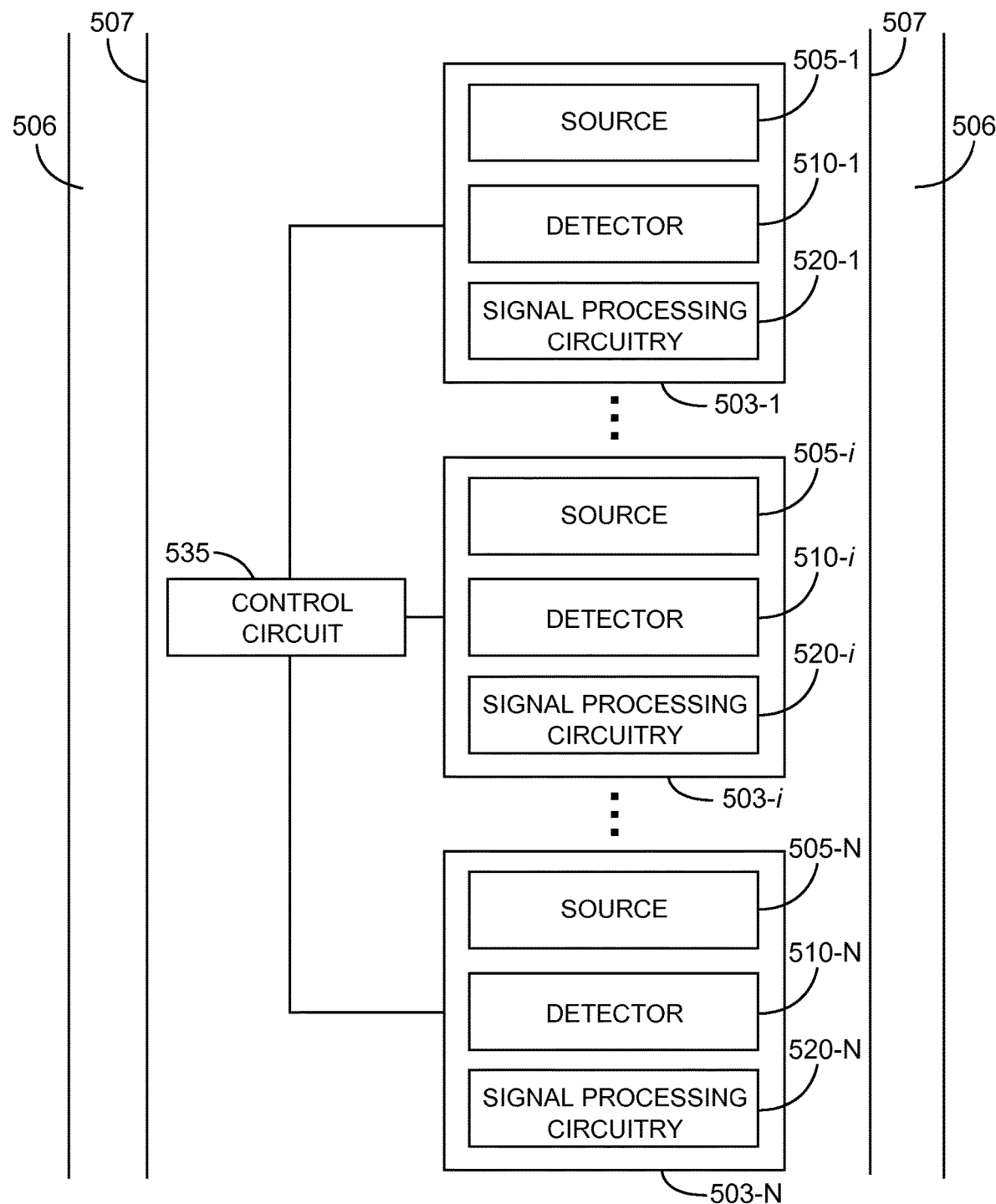
FIG. 5 is a schematic of a plurality of cement indication systems disposed at different locations along a casing, in accordance with various embodiments.

FIG. 5 is a schematic of a plurality of cement indication systems 503-1 . . . 503-N disposed at different locations along a casing 507, each cement indication system operable to detect presence of one or more materials in the fluid region at the respective location of the cement indication system. Each system 503-$i$ of cement indication systems 503-1 . . . 503-N can comprise a source of electromagnetic radiation 505-$i$ arrangeable to generate electromagnetic radiation directed to a fluid region in or around the casing 507 in a wellbore 506; a detector 510-$i$ to receive an electromagnetic response from interaction of the electromagnetic radiation in the fluid region; and signal processing circuitry 520-$i$ operatively coupled to receive an output from the detector 510-$i$ and structured to detect presence of one or more materials in the fluid region, associated with a cementing operation, based on the output. Each one of the plurality of sources of electromagnetic radiation, the plurality of detectors, and the plurality of sources of electromagnetic radiation may be implemented similar or identical to sources of electromagnetic radiation, detectors, and data acquisition units as taught herein.

A control unit 535 can be coupled to the plurality of cement indication systems 503-1 . . . 503-N to receive a signal associated with detection of the presence of the one or more materials by each unit, to compare the signals, and to control valves to regulate circulation of the cement along the casing. Each signal processing circuitry 520-$i$ can be structured to generate a cement indicator as an indication of completion of the cementing operation based on the detection of the presence of the one or more materials. Each corresponding cement indication systems 503-$i$ can be operable with one or more valves to stop circulation of the cement. Each of the plurality of cement indication systems 503-1 . . . 503-N can include a switch to shut down the one or more valves, where the switch is operatively coupled to respective one of the signal processing circuitries 520-1 . . . 520-N and actuated by a signal correlated to the cement indicator. Each of the switches can include a motor. The one or more valves can include two check valves.

Each detector 510-$i$ can include an optical bandpass filter disposed in front of a photodetector with respect to a direction along which the electromagnetic response from the interaction propagates. Each detector 510-$i$ can be arranged with the respective signal processing circuitry 520-$i$ to detect color variation of fluid in the fluid region. Each detector 510-$i$ can include a frequency analyzer such that the frequency analyzer is operable with the signal processing circuitry 520-$i$ to compare one or more wavelengths detected by the frequency analyzer with a known wavelength selected from a group consisting of wavelengths of one or more cement compositions, one or more mud compositions, one or more spacer compositions, and combinations thereof.

Each signal processing circuitry 520-$i$ can be arranged to identify a dye in the cement or a dye in one or more other fluids in the fluid region. Each signal processing circuitry 520-$i$ can be arranged to identify presence of cement in the fluid region based on the absence of detection of interaction of the electromagnetic radiation with the dye in the one or more other fluids in the fluid region. Each one of the cement indication systems 503-1 . . . 503-N can include a communications interface to receive a stored response from a database and provide the stored response to the respective signal processing circuitry, where the signal processing circuitry can be arranged to compare the stored response to the received electromagnetic response to detect the presence of the one or more materials. A memory may be arranged with each signal processing circuitry 520-$i$ to store an expected response associated with one or more of cement, mud, spacer, and dye material.

Figure 6:
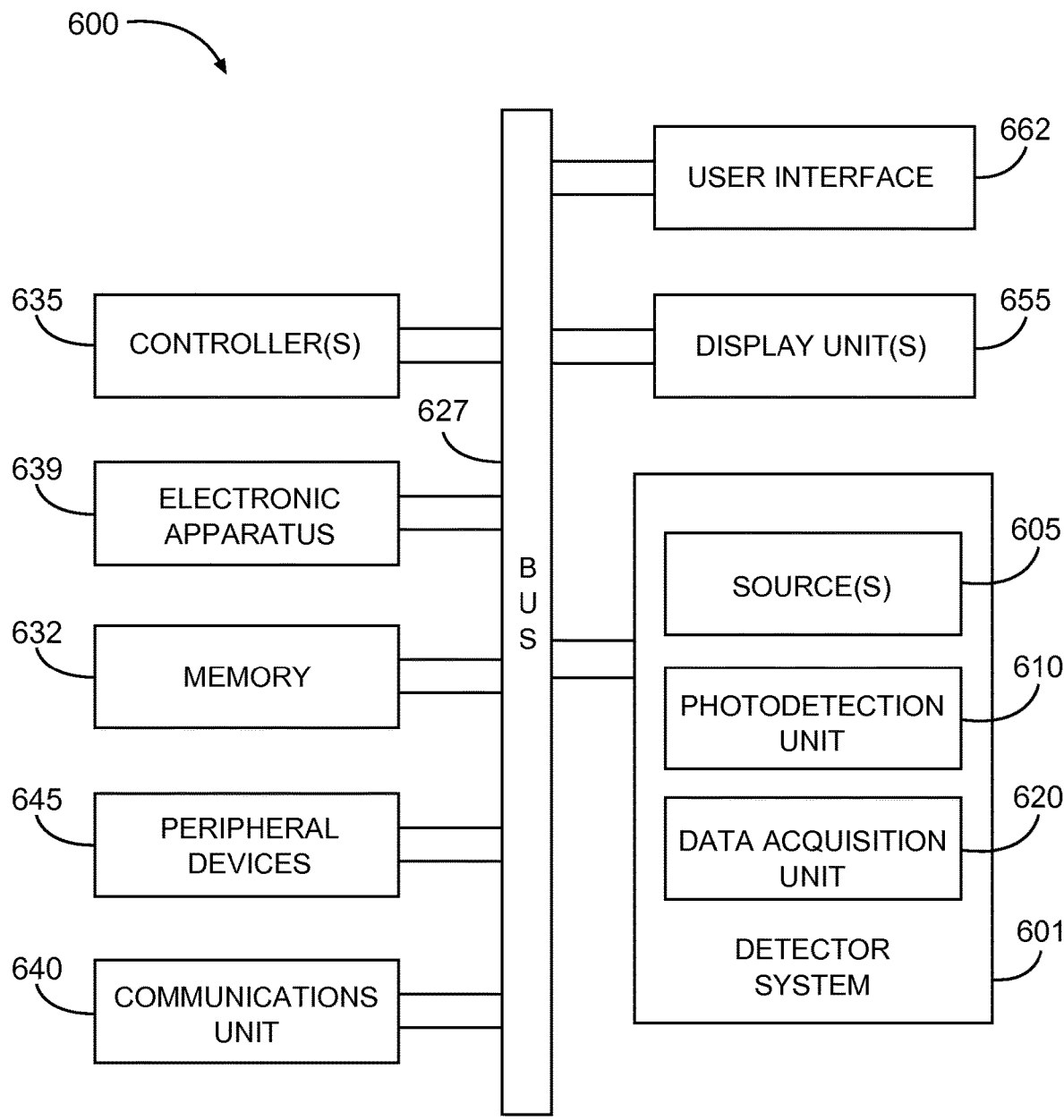
FIG. 6 is a block diagram of an example system, where the system includes a downhole detector system to determine status of a cementing operation, in accordance with various embodiments.

FIG. 6 is a block diagram of an example embodiment of a system 600, where the system 600 includes a downhole detector system 601 to determine status of a cementing operation. The detector system 601 can include an electromagnetic source 605, a photodetection unit 610, and a data acquisition unit 620. The photodetection unit 610 can include one or more photodetectors and other optical elements that adjust and/or manipulate an electromagnetic signal. The downhole detector system 601 can be realized in a similar or identical manner to a cement indication system discussed herein and can be configured to operate in accordance with the teachings herein. The system 600 can be arranged in a land based drilling operation or a subsea drilling operation.

System 600 can include one or more controllers 635 and a memory 632 operable with the one or more controllers 635 to be operated to support operation of the detector system 601. In an embodiment, the one or more controllers 635 can be realized as a single processor or a group of processors. Processors of the group of processors may operate independently depending on an assigned function. The system 600 can be arranged to perform various operations on the data acquired from the detector system 601 operational in a wellbore.

The system 600 can be arranged as a distributed system and can include components in addition to the one or more controllers 635, the memory 632, and the detector system 601. The system 600 can include an electronic apparatus 639 and a communications unit 640. The one or more controllers 635, the memory 632, and the communications unit 640 can be arranged to operate as a processing unit to control management of the detector system 601 and to perform operations on data signals collected by the detector system 601. The memory 632 can include a database having information and other data such that the system 600 can operate on data from the detector system 601. The memory 632 or components of the memory 632 can be integrated in the detector system 601. In an embodiment, features of the detector system 601 can be distributed among the components of the system 600 including memory 632 and/or the electronic apparatus 639.

The communications unit 640 can include downhole communications for communication to the surface at a well site from the detector system 601. Such downhole communications can include a telemetry system. The communications unit 640 may use combinations of wired communication technologies and wireless technologies at frequencies that do not interfere with on-going measurements or operations. The communications unit 640 can allow for a portion or all of the data analysis to be conducted within the detector system 601 with results provided for presentation on the one or more display unit(s) 655 aboveground. The communications unit 640 can provide for data to be sent aboveground such that substantially all analysis is performed aboveground. The communications unit 640 can allow for transmission of commands to the detector system 601 in response to signals provided by a user through a user interface 662. The communications unit 640 or portions of the communication unit 640 on the surface can receive a signal from a pressure spike generated from a valve automatically closing in response to detection of completing a cementing by the detector system 601.

The system 600 can also include a bus 637, where the bus 637 provides electrical conductivity among the components of the system 600. The bus 637 can include an address bus, a data bus, and a control bus, each independently configured. The bus 637 can be realized using a number of different communication mediums that allows for the distribution of components of the system 600. Use of the bus 637 can be regulated by the controller(s) 635. The bus 637 can include a communications network to transmit and receive signals including data signals and command and control signals.

In various embodiments, the system 600 can include peripheral devices 645, which can include additional storage memory and/or other control devices that may operate in conjunction with the controller(s) 635 and/or the memory 632. The display unit(s) 655 can be arranged with a screen display, as a distributed component on the surface, that can be used with instructions stored in the memory 632 to implement the user interface 662 to manage the operation of the detector system 601 and/or components distributed within the system 600. Such a user interface can be operated in conjunction with the communications unit 640 and the bus 637. The display unit(s) 655 can include a video screen, a printing device, or other structure to visually project data/information.

Figure 7:
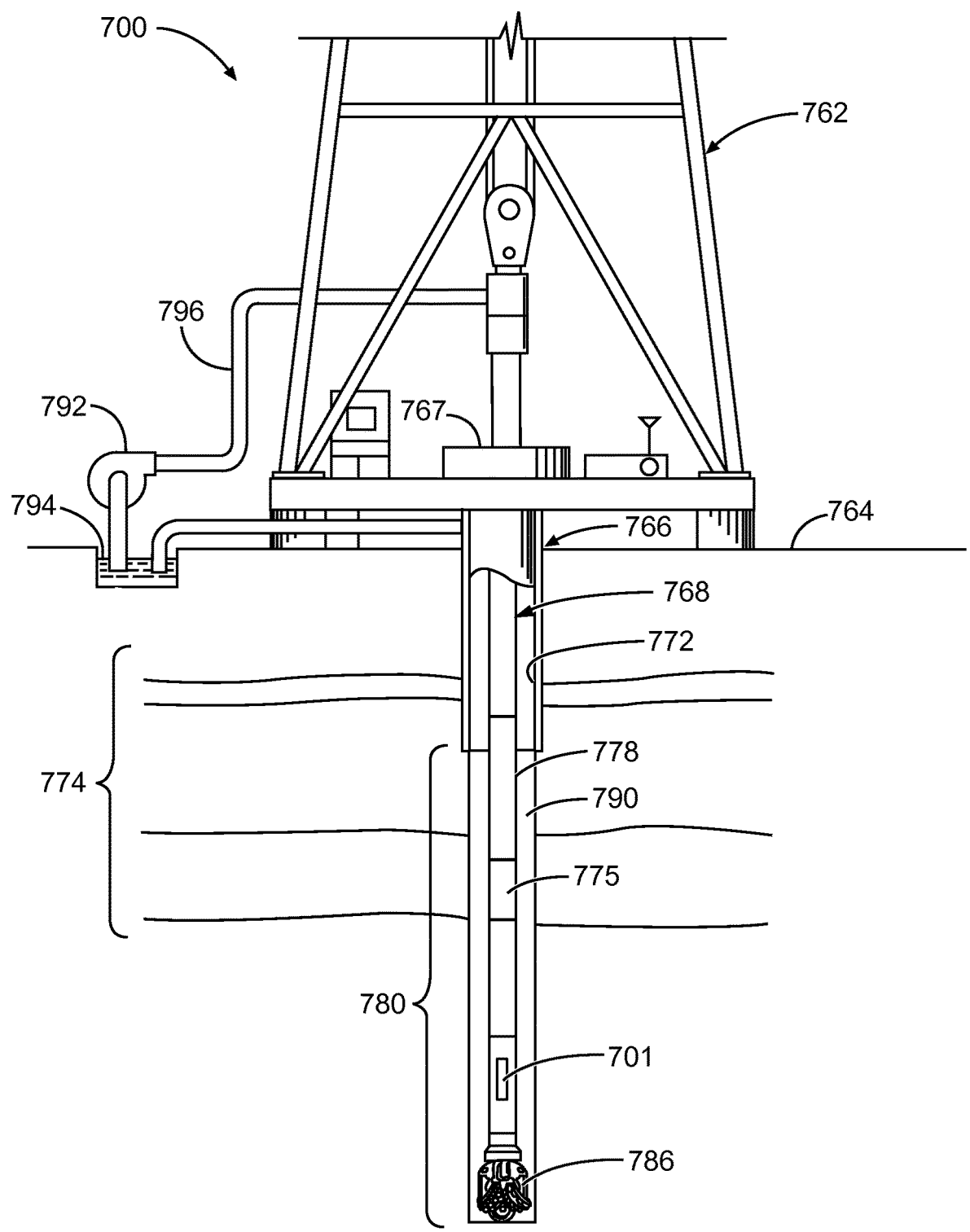
FIG. 7 is a schematic representation of an example system at a drilling site, where the system includes a downhole detector system to determine status of a cementing operation, in accordance with various embodiments.

FIG. 7 is a schematic representation of an example embodiment of a system 700 at a drilling site, where the system includes a downhole detector system 701 to determine status of a cementing operation. The detector system 701 can include an electromagnetic source, a photodetector, and a data acquisition unit. The detector system 701 can be realized in a similar or identical manner to a cement indication system discussed herein and can be configured to operate in accordance with the teachings herein. The system 700 can be arranged in a land based drilling operation or a subsea drilling operation.

The system 700 can include a drilling rig 762 located at a surface 764 of a well 766 and a string of drill pipes, that is, the drill string 768, connected together so as to form a drilling string that is lowered through a rotary table 767 into a wellbore or borehole 772. The drilling rig 762 can provide support for the drill string 768. The drill string 768 can operate to penetrate rotary table 767 for drilling a borehole 772 through subsurface formations 774. The drill string 768 can include drill pipe 778 and a bottom hole assembly 780 located at the lower portion of the drill string 768.

The bottom hole assembly 780 can include drill collar 775 and a drill bit 786. The drill bit 786 can operate to create the borehole 772 by penetrating the surface 764 and the subsurface formations 774. The detector system 701 can be structured for an implementation in the borehole 772 of the well 766.

During drilling operations, the drill string 768 can be rotated by the rotary table 767. In addition to, or alternatively, the bottom hole assembly 780 can also be rotated by a motor (e.g., a mud motor) that is located downhole. The drill collars 775 can be used to add weight to the drill bit 786. The drill collars 775 also can stiffen the bottom hole assembly 780 to allow the bottom hole assembly 780 to transfer the added weight to the drill bit 786, and in turn, assist the drill bit 786 in penetrating the surface 764 and subsurface formations 774.

During drilling operations, a mud pump 792 can pump drilling fluid, which can be drilling mud, from a mud pit 794 through a hose 796 into the drill pipe 798 and down to the drill bit 786. A mud motor can be disposed above drill bit 786 to create rotation for the drill bit. The drilling fluid can flow out from the drill bit 786 and be returned to the surface 764 through an annular area 790 between the drill pipe 778 and the sides of the borehole 772. The drilling fluid may then be returned to the mud pit 794, where such fluid is filtered. In some embodiments, the drilling fluid can be used to cool the drill bit 786, as well as to provide lubrication for the drill bit 786 during drilling operations. Additionally, the drilling fluid may be used to remove the subsurface formation 774 cuttings created by operating the drill bit 786.

A method 1 can comprise: directing electromagnetic radiation from a source to a fluid region in or around a casing in a wellbore; detecting an electromagnetic response at a detector from interaction of the electromagnetic radiation in the fluid region; and detecting presence of one or more materials in the fluid region based on output from the detector, the one or more materials selected from a group including cement, mud, and spacer, associated with a cementing operation.

A method 2 can include elements of method 1 and can include generating a cement indicator indicating completion of the cementing operation based on detection of the presence of the one or more materials.

A method 3 can include elements of method 2 and elements of method 1 and can include stopping circulation of cement in response to generating the cement indicator.

A method 4 can include elements of method 3 and elements of any of methods 1 and 2 and can include stopping circulation of cement to include shutting down one or more valves such that relatively high back pressure is returned back to the surface.

A method 5 can include elements of method 3 and elements of any of methods 1, 2, and 4 and can include stopping circulation of cement to include shutting down one or more valves using a switch actuated by a signal correlated to the cement indicator.

A method 6 can include elements of method 3 and elements of any of methods 1, 2, 4, and 5 and can include shutting down the one or more valves to include using two check valves.

A method 7 can include elements of any of methods 1-6 and can include detecting presence of the one or more materials in the fluid region to include detecting color variation of fluid in the fluid region.

A method 8 can include elements of any of methods 1-7 and can include detecting presence of the one or more materials in the fluid region to include comparing the output of the detector with a response from a database.

A method 9 can include elements of any of methods 1-8 and can include detecting presence of the one or more materials in the fluid region to include comparing one or more wavelengths detected by the detector with a known wavelength selected from a group consisting of wavelengths of one or more cement compositions, one or more mud compositions, one or more spacer compositions, and combinations thereof.

A method 10 can include elements of any of methods 1-9 and can include detecting the electromagnetic response at the detector from interaction of the electromagnetic radiation in the fluid region to include detecting an electromagnetic response at a detector from interaction of the electromagnetic radiation with a dye in cement or a dye in one or more other fluids in the fluid region.

A method 11 can include elements of method 10 and elements of any of methods 1-9 and can include detecting presence of the one or more materials in the fluid region to include the absence of detection of interaction of the electromagnetic radiation with dye in the one or more other fluids in the fluid region.

A method 12 can include elements of any of methods 1-11 and can include detecting the electromagnetic response at the detector from interaction of the electromagnetic radiation in the fluid region to include detecting an electromagnetic response at a detector from interaction of the electromagnetic radiation with a tracer in cement or a tracer in one or more other fluids in the fluid region.

A method 13 can include elements of any of methods 1-12 and can include reverse cementing.

A system 1 can comprise: a source of electromagnetic radiation arrangeable in a casing to generate electromagnetic radiation directed to a fluid region in or around the casing in a wellbore; a detector to receive an electromagnetic response from interaction of the electromagnetic radiation in the fluid region; and signal processing circuitry operatively coupled to receive an output from the detector and structured to detect presence of one or more materials in the fluid region, associated with a cementing operation, based on the output.

A system 2 can include elements of system 1 and can include the source of electromagnetic radiation being one of a plurality of sources of electromagnetic radiation, the detector being one of a plurality of detectors, and the signal processing circuitry being one of a plurality of signal processing circuitries such that the plurality of sources of electromagnetic radiation, the plurality of detectors, and the plurality of signal processing circuitries are disposed at different locations along the casing as a plurality of units, each unit including one of each of the plurality of sources of electromagnetic radiation, the plurality of detectors, and the plurality of signal processing circuitries, each unit operable to detect presence of one or more materials in the fluid region in the fluid region at the respective location of the unit.

A system 3 can include elements of system 2 and elements of system 1 and can include a control circuit coupled to the plurality of units to receive a signal associated with detection of the presence of the one or more materials by each unit, to compare the signals, and to control valves to regulate circulation of the cement along the casing.

A system 4 can include elements of any of system 1-3 and can include the signal processing circuitry being structured to generate a cement indicator as an indication of completion of the cementing operation based on the detection of the presence of the one or more materials.

A system 5 can include elements of system 4 and elements of any of system 1-3 and can include one or more valves to stop circulation of the cement.

A system 6 can include elements of system 5 and elements of any of system 1-4 and can include a switch to shut down the one or more valves, the switch operatively coupled to signal processing circuitry and actuated by a signal correlated to the cement indicator.

A system 7 can include elements of system 6 and elements of any of system 1-5 and can include the switch to include a motor.

A system 8 can include elements of system 5 and elements of any of system 1-4 and 6-7, and can include the one or more valves to include two check valves.

A system 9 can include elements of any of system 1-8 and can include an optical bandpass filter disposed in front of a photodetector with respect to a direction along which the electromagnetic response from the interaction propagates.

A system 10 can include elements of system 9 and elements of any of system 1-8 and can include the detector is arranged with the signal processing circuitry to detect color variation of fluid in the fluid region.

A system 11 can include elements of any of system 1-10 and can include a communications interface to receive a stored response from a database and provide the stored response to the signal processing circuitry, the signal processing circuitry arranged to compare the stored response to the received electromagnetic response to detect the presence of the one or more materials.

A system 12 can include elements of any of system 1-11 and can include the detector to include a frequency analyzer such that the frequency analyzer is operable with the signal processing circuitry to compare one or more wavelengths detected by the frequency analyzer with a known wavelength selected from a group consisting of wavelengths of one or more cement compositions, one or more mud compositions, one or more spacer compositions, and combinations thereof.

A system 13 can include elements of any of system 1-12 and can include the signal processing circuitry being arranged to identify a dye in the cement or a dye in one or more other fluids in the fluid region.

A system 14 can include elements of system 13 and elements of any of system 1-12 and can include the signal processing circuitry being arranged to identify presence of cement in the fluid region based on the absence of detection of interaction of the electromagnetic radiation with the dye in the one or more other fluids in the fluid region.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising
directing electromagnetic radiation from a source to a fluid region in or around a casing in a wellbore;
detecting an electromagnetic response at a detector from interaction of the electromagnetic radiation in the fluid region;
detecting presence of one or more materials in the fluid region based on output from the detector, the one or more materials selected from a group including cement, mud, and spacer, associated with a cementing operation;
generating a cement indicator indicating completion of the cementing operation based on detection of the presence of the one or more materials;
partially shutting one or more valves to generate high back pressure based on the cement indicator; and
slowly fully shutting the one or more valves to reduce the high back pressure.

2. The method of claim 1, wherein detecting presence of the one or more materials in the fluid region includes detecting color variation of fluid in the fluid region, comparing the output of the detector with a response from a database, or comparing one or more wavelengths detected by the detector with a known wavelength selected from a group consisting of wavelengths of one or more cement compositions, one or more mud compositions, one or more spacer compositions, and combinations thereof.

3. The method of claim 1, wherein detecting the electromagnetic response at the detector from interaction of the electromagnetic radiation in the fluid region includes detecting an electromagnetic response at a detector from interaction of the electromagnetic radiation with a dye or a tracer in cement, or a dye or a tracer in one or more other fluids in the fluid region.

4. The method of claim 3, wherein detecting presence of the one or more materials in the fluid region includes the absence of detection of interaction of the electromagnetic radiation with dye in the one or more other fluids in the fluid region.

5. The method of claim 1, wherein the method includes reverse cementing.

6. A system comprising
a source of electromagnetic radiation arrangeable in a casing to generate electromagnetic radiation directed to a fluid region in or around the casing in a wellbore;
a detector to receive an electromagnetic response from interaction of the electromagnetic radiation in the fluid region;
signal processing circuitry operatively coupled to receive an output from the detector and structured to detect presence of one or more materials in the fluid region, associated with a cementing operation, based on the output and to generate a cement indicator as an indication of completion of the cementing operation based on the detection of the presence of the one or more materials;
one or more valves to stop circulation of the cement; and
a switch to shut down the one or more valves, the switch operatively coupled to signal processing circuitry and actuated by a signal correlated to the cement indicator, the switch programmed to:
partially shut the one or more valves to generate high back pressure based the signal correlated to the cement indicator; and
slowly fully shut the one or more valves to reduce the high back pressure.

7. The system of claim 6, wherein the source of electromagnetic radiation is one of a plurality of sources of electromagnetic radiation, the detector is one of a plurality of detectors, and the signal processing circuitry is one of a plurality of signal processing circuitries such that the plurality of sources of electromagnetic radiation, the plurality of detectors, and the plurality of signal processing circuitries are disposed at different locations along the casing as a plurality of units, each unit including one of each of the plurality of sources of electromagnetic radiation, the plurality of detectors, and the plurality of signal processing circuitries, each unit operable to detect presence of one or more materials in the fluid region at the respective location of the unit.

8. The system of claim 7, wherein the system includes a control circuit coupled to the plurality of units to receive a signal associated with detection of the presence of the one or more materials by each unit, to compare the signals, and to control the one or more valves to regulate circulation of the cement along the casing.

9. The system of claim 6, wherein the detector includes an optical bandpass filter disposed in front of a photodetector with respect to a direction along which the electromagnetic response from the interaction propagates.

10. The system of claim 9, wherein the detector is arranged with the signal processing circuitry to detect color variation of fluid in the fluid region.

11. The system of claim 6, wherein the system includes a communications interface to receive a stored response from a database and provide the stored response to the signal processing circuitry, the signal processing circuitry arranged to compare the stored response to the received electromagnetic response to detect the presence of the one or more materials.

12. The system of claim 6, wherein the detector includes a frequency analyzer such that the frequency analyzer is operable with the signal processing circuitry to compare one or more wavelengths detected by the frequency analyzer with a known wavelength selected from a group consisting of wavelengths of one or more cement compositions, one or more mud compositions, one or more spacer compositions, and combinations thereof.

13. The system of claim 6, wherein the signal processing circuitry is arranged to identify a dye in the cement or a dye in one or more other fluids in the fluid region.

14. The system of claim 13, wherein the signal processing circuitry is arranged to identify presence of cement in the fluid region based on the absence of detection of interaction of the electromagnetic radiation with the dye in the one or more other fluids in the fluid region.

* * * * *